United States Patent [19]

Wallace et al.

[11] Patent Number: 4,846,257
[45] Date of Patent: Jul. 11, 1989

[54] EXHAUSTIBLE COOLER AND SOLAR POWERED WARMER

[75] Inventors: Terry A. Wallace, 107 Kathyrn La., Greenville, N.C. 27834; Ventonia L. Keyes, Jamesville; Harry C. Hopkins, Williamston, both of N.C.

[73] Assignee: Terry A. Wallace, Greenville, N.C.

[21] Appl. No.: 79,221

[22] Filed: Jul. 29, 1987

[51] Int. Cl.[4] ............................................. F25B 29/00
[52] U.S. Cl. ................................. 165/39; 165/48.1; 165/48.2; 165/58; 165/918; 62/223; 62/457.9; 126/451
[58] Field of Search ............ 62/293, 294, 457, 514 R, 62/223; 165/48.1, 48.2, 58, 918, 919, 39; 126/451

[56] References Cited

U.S. PATENT DOCUMENTS

| | | | |
|---|---|---|---|
| 687,718 | 12/1901 | Bowen | 62/457 |
| 1,979,222 | 10/1934 | Goodwin | 165/58 |
| 2,584,435 | 2/1952 | Doerr | 165/58 |
| 2,853,205 | 9/1958 | Boyd | 165/58 |
| 3,611,738 | 10/1971 | Maurer et al. | 62/514 R |
| 3,633,381 | 1/1972 | Haaf | 62/457 |
| 3,665,728 | 5/1972 | Stoller | 62/514 R |
| 3,693,371 | 9/1972 | Clark | 62/514 R |
| 3,808,401 | 4/1974 | Wright et al. | 165/58 |
| 3,896,786 | 7/1975 | Clevett | 126/451 |
| 3,959,982 | 6/1976 | Denis et al. | 62/457 |
| 4,054,037 | 10/1977 | Yoder | 62/294 |

Primary Examiner—Albert W. Davis, Jr.
Assistant Examiner—John K. Ford
Attorney, Agent, or Firm—Darby & Darby

[57] ABSTRACT

Apparatus for keeping food hot and/or cold includes a body of heavily insulated material in which there are separate recesses for hot food and cold food. The cold food is kept cold by means of an ice compartment located in the bottom of one recess and an exhaustible refrigeration unit located in the top of that recess. The hot food is kept warm by means of an electrical coil in the bottom of the recess and a solar heating panel in the top.

10 Claims, 1 Drawing Sheet

}

EXHAUSTIBLE COOLER AND SOLAR POWERED WARMER

TECHNICAL FIELD

The present invention relates to devices for keeping foods hot or cold and, more particularly, to devices which utilize power to keep foods hot or cold.

BACKGROUND OF THE INVENTION

In modern homes, stoves are used to heat food and refrigerators are used to keep food cool. However, these devices are not readily portable and are not practical when the user is away from home, e.g., on a picnic or long trip.

An insulated thermos bottle is the most common device used to keep food, including liquids, either hot or cold. When a thermos is used, the food is preheated or cooled before it is placed in the thermos. Once in the thermos, the insulation of the thermos prevents heat exchange so that hot foods will retain their heat and cold foods will remain cool for a long period of time. However, food stored in a thermos or other insulated storage device, eventually reaches room temperature. Thus is it known to supplement the heat-retaining ability of a thermos by adding additional heat.

Additional heat can be applied to food by adding energy to it. This can be accomplished with electrical heating coils or by burning a combustible material (e.g., butane). Also, the radiant energy of the sun can be concentrated and reflected onto the container so as to warm it.

Cooling it typically performed by expansion of a gas, e.g., FREON. However, initially the gas must be compressed and this takes substantial energy and rather bulky compressor equipment. One alternative is to pack ice or some other frozen material in or around the thermos. This ice acts to supplement the low temperature of the food.

Typically, heat insulating thermos devices are designed for liquids, while cooling devices are designed for liquids and other foods. Also, heat and cold retaining devices are usually kept separate in order to prevent heat exchange between the two units.

BACKGROUND OF THE INVENTION

The present invention is directed to a device for providing means for supplementing the retention of heat or cold in a thermos device by means of an auxiliary cooling device and a passive solar heater.

In an illustrative embodiment of the invention, a basket or other container of plastic material is formed with two separate recesses or compartments adapted to receive solid or liquid food containers. Each compartment is heavily insulated and may be completely closed with an insulated cover.

One compartment is designed for keeping food cool and has a portion for storage of ice. In addition, a precompressed source of gas, e.g., FREON, is provided. An electrical circuit powered by a small battery allows the gas to expand into a coiled tube on a periodic basis, or as determined by the temperature in the compartment. The expansion of the gas causes the temperature of the tube to drop. A small fan powered by the battery blows air over the tube coil and into the compartment in order to supplement the cooling of the food. Naturally, when the gas is completely exhausted, or the battery runs down, the cooling effect will cease. However, the overall effect is to expand the period during which the food is kept cool.

The other compartment tends to keep hot food warm because of the insulation. However, the top of this other compartment can be removed and replaced with a black cover surrounded by solar reflecting panels in order to heat the contents of the compartment by solar energy.

On an overcast day, the insulated cover remains in place and the preheated food remains warm due to the insulation. A heating coil may be located in the bottom of this compartment and may also be used to add additional heat to the food on an overcast day. The power for the heating coil may be derived from an electrical outlet or from a battery (e.g., through the cigarette lighter of a car).

When the sun is shining, radiant heat is added to the food by substituting the solar reflecting panels for the conventional insulated cover.

BRIEF DESCRIPTION OF THE DRAWING

The foregoing and other features of the present invention will be more readily apparent from the following detailed description and drawings of an illustrative embodiment of the invention in which.

DESCRIPTION OF AN ILLUSTRATIVE EMBODIMENT

Figure 1:
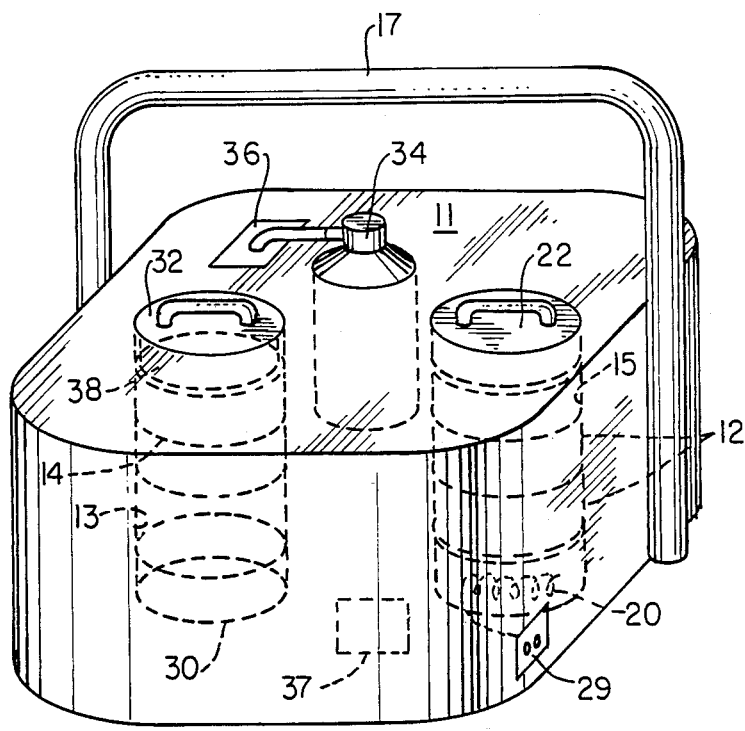
FIG. 1 is a front perspective view of a picnic basket according to the present invention.

In FIG. 1 there is shown a basket for retaining both hot food in cylindrical containers 12 and cold food in cylindrical containers 14 (both in dotted line in FIG. 1). Containers 12, 14 are received in cylindrical recesses 13, 15 provided in the heavily insulated body 11 of the basket. For ease of transportation, handle 17 is connected to the body and can be grasped by the user's hand.

The recess 15, to the right in FIG. 1, is adapted to receive the containers 12 for warm food. The insulation of the body 11 helps the food to retain its heat. However, as one means of supplementing this heat, an electrical coil 20 may be provided at the bottom of recess 15. If this coil is connected to a source of electrical energy, e.g., the cigarette lighter output of a car, through socket 29 on the side of the basket, the coil can generate heat in order to keep the food warm.

Figure 2:
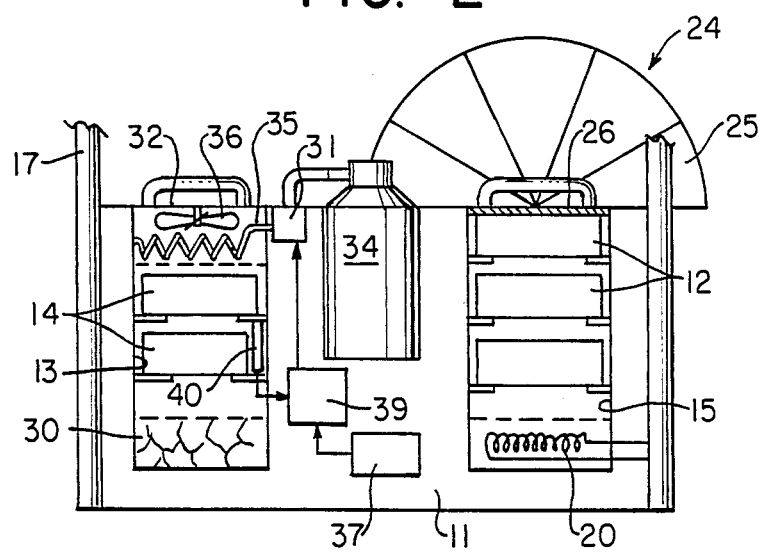
FIG. 2 is a front sectional, partially schematic view of a basket with a solar reflector top.

As shown in FIG. 1, an insulated cap 22 closes off the top of the recess 15 and acts to keep the heat within that recess. However, when the sun is shining, the heat within the recess can be supplemented by solar energy. This is accomplished by replacing cap 22 with a solar collecting cap 24 as shown in FIG. 2. This solar collecting cap has parabolic reflecting plates 25 which collect the rays of the sun and direct them onto a heat transmissive cover 26 which is painted black. The effect of this is to raise the temperature of cover 26 such that additional heat is introduced in the recess 15 in order to keep the food warm.

As best shown in FIG. 2, recess 13 has a portion or container 30 at its base which is adapted to receive ice or other frozen material. The food containers 14, which are spaced throughout the recess 13, are kept cool because of the ice and because of an insulated cover 32. As an alternative, the ice may be installed in a cavity 3B in cap 32. Since cool air descends, the cooling effect of the ice is more efficiently utilized if the ice is above the food.

In the embodiment shown, however, the ice is in the chamber 30 below the food and parts of an exhaustible refrigeration unit are installed in the top of recess 13. As part of this unit the cap 32 is made hollow and is open at its bottom. Further, cap 32 is equipped with copper metal tubing 35 bent into a coil shape and a small electrical fan 36. The electrical fan may be driven by electrical energy from a battery 37 under the control of an electrical circuit 39. The tubing 35 in cap 32 is connected to a source of compressed FREON gas 34. This source of compressed gas may be of the type conventionally used to charge air conditioning units in automobiles. A valve 31 under the control of circuit 39 determines when gas from source 34 is injected into the coils 35. This unit will continue to cool the food in recess 13 until the gas is exhausted.

In preferred embodiment, an electrical thermometer 40 is located in recess 13 and continuously monitors its temperature. A signal related to the temperature is delivered to circuit 39 from thermometer 40. When the temperature raises above a preset level, circuit 39 opens valve 31 so that a spray of FREON gas enters coil 35 through an orifice and cools it. Then, fan 36 is turned on to create a low temperature air flow from the coil into the portion of recess 13 that has the food containers 14.

According to the present invention, the conventional heat-retaining and cold-retaining ability of an insulated container is supplemented by an electrical heating coil or a solar heating panel with respect to hot food, and a source of ice and a consumable refrigeration unit with respect to the cool food.

While the invention has been particularly shown and described with reference to a preferred embodiment thereof, it will be understood by those skilled in the art that various changes in form and details may be made therein without departing from the spirit and scope of the invention.

We claim:

1. A device for keeping some food hot and for keeping other food cold, comprising:
   a heavily insulated body defining first and second generally vertical recesses, said recesses being adapted to receive containers of food, the first recess being designed to keep the food cool and the second recess being designed to keep other food hot;
   a frozen material container located in said first recess;
   an insulating cap closing off the top of said first recess;
   an electrical heating coil in the bottom of said second recess, said heating coil being adapted to warm the food in said second recess when an electrical current is passed therethrough; and
   a passive solar heat collector located in the top of said second recess and acting to close off said second recess, said collector including a heat transmissive cap, closing off the recess and solar reflecting panels for directing solar light rays into said heat transmissive cap.

2. A device as claimed in claim 1 wherein the heat transmissive cap is black.

3. A device as claimed in claim 1 wherein the frozen material container is located in the top of the first recess.

4. A device as claimed in claim 1 wherein the frozen material container is located in the bottom of the first recess and further including an exhaustible refrigeration unit located at the top of the first recess.

5. A device as claimed in claim 4 wherein the refrigeration unit comprises:
   a heat transmissive tube located in a hollowed section of the insulating cap towards its bottom;
   an electrical fan located in the top of the hollow section of the cap above the tube;
   a source of compressed gas;
   means for selectively discharging the compressed gas through a narrow orifice into the tube;
   a source of electrical energy; and
   means for applying the electrical energy to the fan to cause it to force air over the tube and into the first recess.

6. A device as claimed in claim 5 further including a temperature measuring device for measuring the temperature in the first recess; and
   a control circuit for operating the means for discharging and the means for applying electrical energy, whenever the temperature in the first recess is above a predetermined value.

7. A device for keeping some food hot and for keeping other food cold, comprising:
   a heavily insulated body defining first and second generally vertical recesses, said recesses being adapted to receive containers of food, the first recess being designed to keep the food cold and the second being designed to keep the food hot;
   an insulated cap closing the top of said first recess and a frozen material container located in the bottom of said first recess;
   an exhaustable refrigeration unit being located in the top of the first recess, said refrigeration unit having a tubular section of heat transmissive material located in a hollow portion of said cap and being positioned toward the bottom of the hollow portion;
   an electrical fan located in the hollow portion above the tubular section to create a low temperature air flow; and
   a source of heat being located in said second recess.

8. A device as claimed in claim 7, wherein the refrigeration unit further comprises:
   a source of compressed gas;
   a temperature device for measuring the temperature in the first recess;
   means for selectively discharging the compressed gas into the tube;
   a source of electrical energy;
   means for applying the electrical energy to the fan to cause it to force air over the coils and into the first recess; and
   a control circuit for operating the means for selectively discharging and the means for applying electrical energy, whenever the temperature in the first recess is above a preset value.

9. A device as claimed in claim 8, wherein the source of heat energy includes a passive solar heat collector located in the top of said second recess and acting to close off said second recess, said solar heat collector including a heat transmissive cap and solar reflecting panels which direct solar light rays onto said heat transmissive cap.

10. A device as claimed in claim 9, wherein said source of heat further includes an electrical heating coil in the bottom of said second recess.

* * * * *